United States Patent [19]
Eberle

[11] Patent Number: 5,986,349
[45] Date of Patent: Nov. 16, 1999

[54] WAVE ENHANCER FOR A SYSTEM FOR PRODUCING ELECTRICITY FROM OCEAN WAVES

[76] Inventor: William J. Eberle, 102 Oak Forest Trail, Euless, Tex. 76039

[21] Appl. No.: 09/080,562

[22] Filed: May 18, 1998

[51] Int. Cl.⁶ .................................................. F03B 13/12
[52] U.S. Cl. ............................................. 290/53; 290/54
[58] Field of Search .................................. 290/42, 43, 53, 290/54; 60/398

[56] References Cited

U.S. PATENT DOCUMENTS

| | | |
|---|---|---|
| 242,233 | 5/1881 | Swales . |
| 321,229 | 6/1885 | Leavitt . |
| 366,768 | 6/1887 | Elias . |
| 581,067 | 4/1897 | Fletcher . |
| 706,620 | 8/1902 | Williams . |
| 739,538 | 9/1903 | Fredson . |
| 787,182 | 4/1905 | Huchings . |
| 791,366 | 5/1905 | Rapp . |
| 852,232 | 4/1907 | Kohler . |
| 879,992 | 2/1908 | Wilson . |
| 884,080 | 4/1908 | Fallis . |
| 975,157 | 11/1910 | Quedens . |
| 1,377,163 | 5/1921 | Pool . |
| 1,389,445 | 8/1921 | Hare . |
| 1,403,702 | 1/1922 | Melvin . |
| 1,471,222 | 10/1923 | Taylor . |
| 1,623,341 | 4/1927 | Hare . |
| 1,647,025 | 10/1927 | Stich . |
| 2,668,918 | 2/1954 | Howell . |
| 2,706,077 | 4/1955 | Searcy ........................................ 230/67 |
| 2,749,085 | 6/1956 | Searcy ........................................ 253/10 |
| 3,060,119 | 10/1962 | Carpenter ......................... 210/242.1 X |
| 3,487,228 | 12/1969 | Krigel et al. ............................... 290/52 |
| 3,652,431 | 3/1972 | Reynolds .................................. 204/129 |
| 4,125,463 | 11/1978 | Chenoweth ......................... 210/170 X |
| 4,206,601 | 6/1980 | Eberle ........................................ 60/398 |
| 4,235,693 | 11/1980 | Rowe et al. ........................ 204/129 X |
| 4,249,084 | 2/1981 | Villanueve et al. ....................... 290/53 |
| 4,258,270 | 3/1981 | Tornkvist .................................... 290/53 |
| 4,335,576 | 6/1982 | Hopfe .............................. 210/242.1 X |
| 4,447,740 | 5/1984 | Heck .......................................... 290/53 |
| 4,452,696 | 6/1984 | Lopez .............................. 210/242.1 X |
| 4,454,429 | 6/1984 | Buonome ................................... 290/53 |
| 4,490,232 | 12/1984 | Lapeyre .................................... 204/278 |
| 4,539,485 | 9/1985 | Neuenschwander ....................... 290/53 |
| 4,883,411 | 11/1989 | Windle .................................... 417/331 |
| 5,167,786 | 12/1992 | Eberle ...................................... 204/229 |
| 5,394,695 | 3/1995 | Sieber ....................................... 60/398 |

*Primary Examiner*—Nicholas Ponomarenko
*Attorney, Agent, or Firm*—Woodock Washburn Kurtz Mackiewicz & Norris LLP

[57] ABSTRACT

A wave enhancer of this invention may be employed with a wave power collection system. This system converts the movement of ocean waves into useful energy. In order to convert the energy of the ocean waves into useful energy, the wave power collection system may have a float that floats on the surface of the ocean. Coupled to the float may be a mechanism for converting the movement of the float into another form of energy. This mechanism may be a hydraulic system that causes the up and down movement of the float to pressurize a hydraulic fluid. This pressurized hydraulic fluid can be used to power a prime mover, which in turn can drive a load, such as an electrical generator.

The wave enhancer of this invention increases the amplitude of a given wave. This increase in amplitude causes a corresponding increase in the amount of energy that can be extracted from a given wave. In a preferred embodiment, the wave enhancer includes a plate that is disposed on a cylinder of the wave power collection system. The plate is preferably disposed below the ocean surface, and the cylinder extends upward and is coupled to the float. Preferably, the wave enhancer is disposed in a predetermined angular relationship with the direction of motion of the waves. As the waves contact the plate a vertical lifting force is created. This lifting force causes the amplitude of the waves to be enhanced.

20 Claims, 3 Drawing Sheets

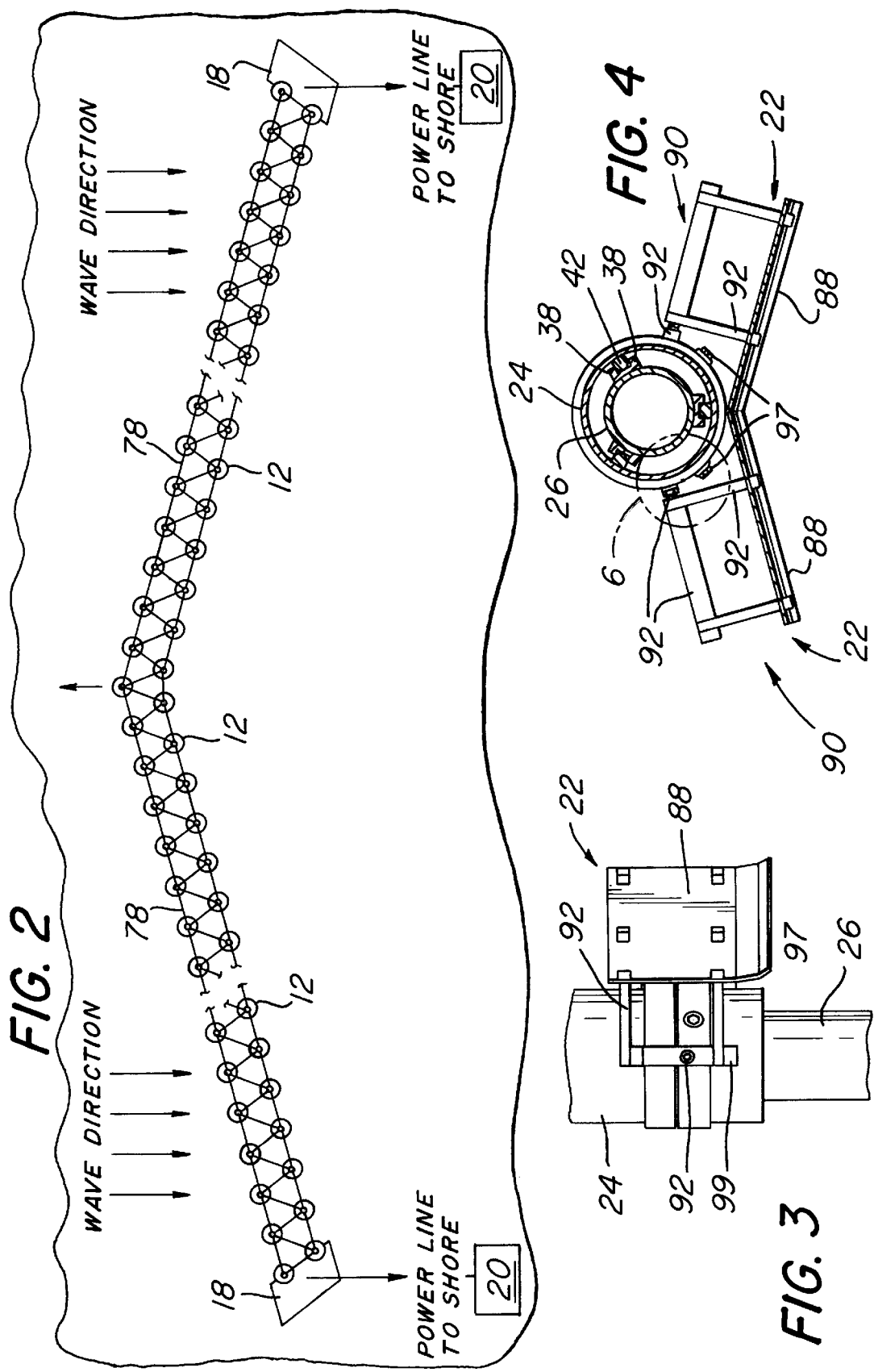

WAVE ENHANCER FOR A SYSTEM FOR PRODUCING ELECTRICITY FROM OCEAN WAVES

BACKGROUND OF THE INVENTION

This invention relates to wave enhancers for enhancing the amplitude of ocean waves so that an additional amount of energy corresponding to the increase in the amplitude of the waves from the wave enhancers can be extracted from the waves. This invention also relates to wave power collection systems and methods of employing wave power collection systems that have wave enhancers.

Wave power collection systems have been developed to extract energy from ocean waves based on the rise and fall of the ocean waves. Such systems generally harness the energy from the ocean waves and convert it into useful energy. For example, the energy captured from the ocean waves may be used to produce electricity. In order to capture the energy form the ocean waves, wave power collection systems typically employ a plurality of floats that float on the surface on the ocean and rise and fall with the waves. Attached to these floats are mechanisms that convert the vertical motion of the floats into useful energy.

A variety of mechanisms have been developed that convert the movement of floats into useful energy. For example, in U.S. Pat. No. 5,167,786 entitled "Wave Power Collection Apparatus," which is hereby incorporated by reference and, which was also invented by the same inventor as this invention and owned by the assignee of this invention, a wave power collection system is described that generates electricity from the movement of the waves and uses this electricity to power an electrolysis means that breaks water into hydrogen and oxygen and stores the hydrogen and oxygen. In this system, the hydrogen and oxygen can then be used to produce useful work.

By way of further example, the floats of a wave power collection system may include an air compressor that is driven by the vertical movement of the floats in response to the waves. In this type of system, the air compressor produces compressed air. The energy in this compressed air can be extracted and converted into useful work. A wave power collection system of this type is described in U.S. Pat. No. 4,206,601 entitled "Compressed Air Producing, Tidal And Wave-Power Collection Apparatus For Installation in Large Bodies of Water," which is hereby incorporated by reference and, which was also invented by the inventor of the invention disclosed in this application.

As described above, the amount of energy that is extracted from an ocean wave depends on the energy the ocean wave has and in particular, the amplitude of the ocean wave. Thus, ideally such energy converting systems are employed in areas where the ocean waves have the greatest magnitude. However, these ideal areas are often located geographically in areas where it is not practical to employ an energy converting system. For example, it is preferable to employ the energy converting systems near the coast line, to reduce transmission losses and transportation costs. Often the waves produced along the coast lines are not great enough in magnitude to generate the requisite amount of energy. Therefore, there exists a need for a wave enhancer that will enhance the amplitude of the waves, so that energy converting systems may be located in areas that typically have relatively small waves.

Furthermore, it is preferably to increase the magnitude of the amplitude of waves that may be large enough already to drive an energy systems. By increasing the amplitude of these waves, more energy can be extracted from the waves and the system can produce more energy.

The system of this invention includes a wave enhancer and wave power collection systems that employ the wave enhancer of this invention.

SUMMARY OF THE INVENTION

A system for enhancing the amplitude of an ocean wave includes a float for floating on the surface of the fluid and a cylinder coupled to the float. The float preferably has the shape of a toroid, and the cylinder is preferably disposed inside of the aperture defined by the toroidal shaped float. The system further includes a wave enhancer, coupled to the cylinder. The cylinder extends from above the surface of the ocean to below the surface of the ocean. A pilaster is preferably coupled to the cylinder and extends from above the surface of the ocean to below the ocean floor to anchor the system.

The wave enhancer preferably extends from the cylinder below the surface of the ocean. Preferably, the wave enhancer is a plate that has a surface that is disposed in an angular relationship with the direction of motion of the ocean waves. As the wave moves and contacts the wave enhancer, the horizontal force or the force of the waves in the direction parallel to the ocean floor is converted into a vertical force or lifting force. This force causes the amplitude of a given wave to be increased. The wave enhancer may be disposed in an angular relationship with the horizontal force of the waves in both of the directions that are normal to the horizontal force of the waves. By disposing the wave enhancer in these preferable angular relationships, an optimum lifting force and an optimum increase in the amplitude of the waves is created. In a preferred embodiment, the wave enhancer include two plates that each extend from the cylinder.

The increase in the amplitude of the waves caused by the wave enhancer creates an additional amount of energy that corresponds to the increase in the amplitude. Because of the increase in the amount of energy, the wave power collection system can provide an additional amount of energy that can be used to power a prime mover. The prime mover can be used to power a load, such as an electrical generator.

In order to convert the motion of the floats into useful energy, the wave power collection system may have a converting mechanism. This converting mechanism preferably includes a tubular member that extends from the cylinder, and a rod that extends from the float into the tubular member. The rod has a head inside the interior of the tubular member, so that the rod acts as a piston as it moves with respect to the tubular member. Inside the tubular member is hydraulic fluid. As the float moves up and down in response to the ocean waves, the rod moves back and forth in the tubular member. This movement of the rod in either direction causes it to pressurize the fluid in the tubular member. A valve and a piping system may connect the tubular member to the prime mover. Thus, as the rod moves and pressurizes the hydraulic fluid, the valve ports it through the piping system to the prime mover. The valve acts to connect the side of the tubular member with respect to the rod that is being pressurized with the prime mover, so that the side of the tubular member that has the increased pressurized fluid is connected to the prime mover.

Other features of this invention are described below.

BRIEF DESCRIPTION OF THE DRAWINGS

FIG. 2 is a diagrammatical view of another portion of a preferred embodiment of the system of this invention;

FIG. 3 is a cross section taken along line 3—3 of FIG. 1;

FIG. 4 is a cross section taken along line 4—4 of FIG. 1;

DETAILED DESCRIPTION OF THE PREFERRED EMBODIMENTS

Figure 1:
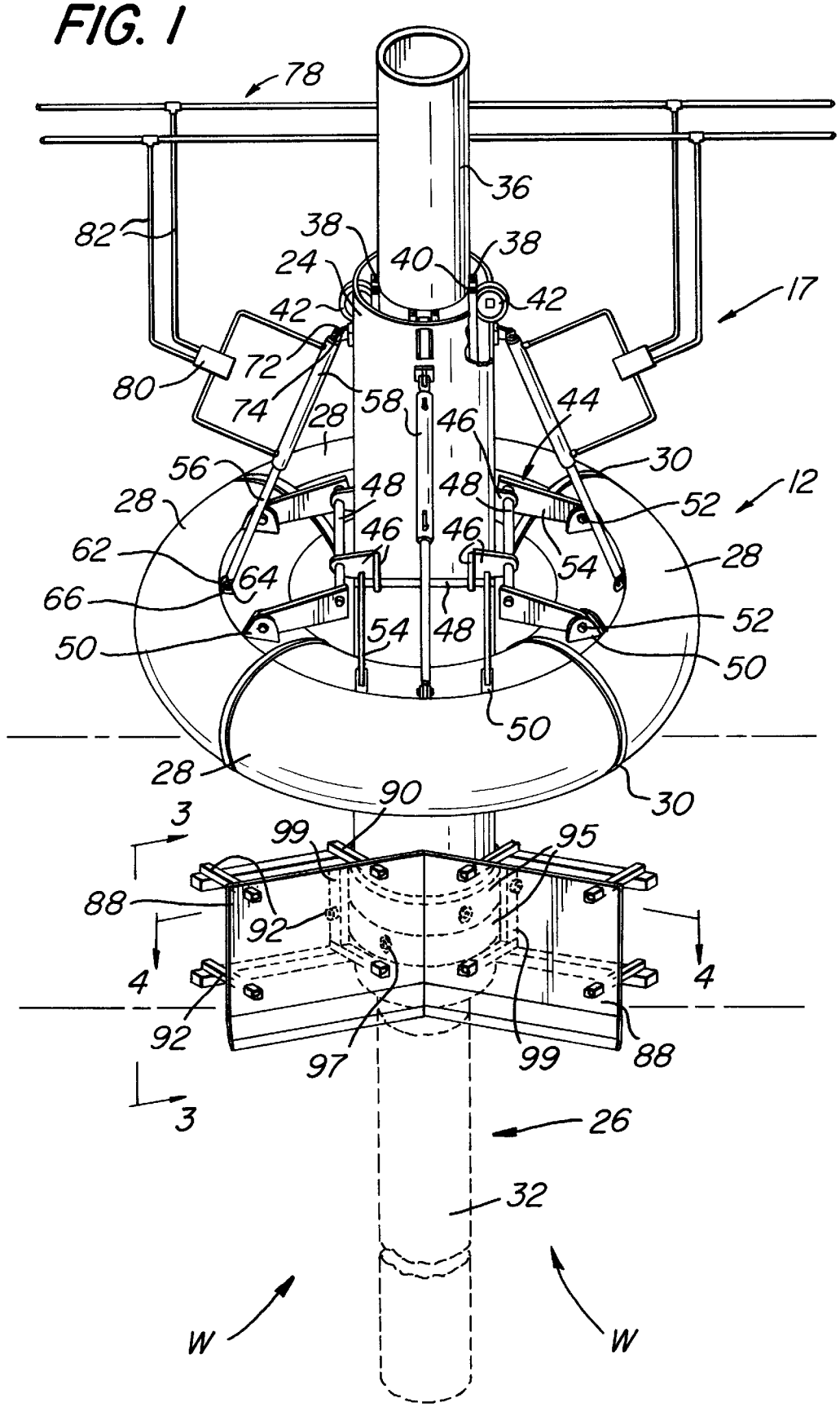
FIG. 1 is a diagrammatical view of a portion of a preferred embodiment of a system of this invention.

As shown in FIGS. 1 and 2, wave power collection systems 10 generally have at least one float 12, and preferably a plurality of floats 12, which float on the surface 14 of the ocean. The motion of the ocean waves causes these floats 12 to move up and down with respect to the ocean floor 16. This up and down or vertical movement of the floats 12 can be converted into useful work in a variety of ways by a converting mechanism 17 for converting the movement of the floats into useful energy. These converting mechanisms include, but are not limiting to, pressurizing air or hydraulic fluid systems that compress gases, such as hydrogen and oxygen, and mechanical systems (not shown) such as a clutch system. A prime mover 18 can be driven by any of the mechanisms 17 for converting the movement of the floats 12 into energy in another form. The prime mover 18 can then be used to drive a load 20, such as an electrical generator. Such systems are known in the art. The wave enhancer 22 of this invention is described with respect to a wave power collection system 10 that uses a hydraulic mechanism 17 for converting the movement of the floats into useful energy. The increase in pressure of a hydraulic fluid of the hydraulic mechanism is used to drive a prime mover 18, such as a motor, which drives an electrical generator 20. The wave enhancer 22 of this invention may be employed with a variety of other systems, such as those mentioned, and the wave enhancer 22 is described with respect to a hydraulic converting mechanism 17 by way of example and not by way of limitation.

By way of overview, as shown in FIG. 1, this invention includes an improved wave power collection system 10 that has a wave enhancer 22 for increasing the amplitude of a wave. This increase in the amount of the amplitude of a wave causes a corresponding increase in the amount of energy that can be extracted from the wave.

As referred to above, in order to convert the power of the ocean waves into useful energy, the wave power collection system 10 of this invention compresses a hydraulic fluid and uses this pressurized fluid to drive a hydraulic motor 18. In the embodiment shown in FIGS. 1 and 2, the wave power collection system 10 includes a cylinder 24, a hydraulic converting mechanism 17, a float 12, and a pilaster 26. As shown, the float 12 is preferably annular or toroidal in shape, and in this embodiment is divided into a multiple segments 28. In the embodiment shown, the float 12 may be referred to as a toroid. Preferably, the float 12 is divided into four segments 28. Each of these segments 28 moves independently with the motion of the waves, as is described in more detail below. A flanged connection 30 preferably connects each of the segments 28 to two of the other segments 28. The wave power collection system 10 of this invention may include a plurality of floats 12, as shown in FIG. 2.

As alluded to above, the waver power collection system 10 may further include a cylinder 24 and a pilaster 26. A first portion 32 of the pilaster 26 is preferably disposed below the floor 16 of the ocean. In a preferred embodiment, the first portion 32 of the pilaster that is disposed below the ocean floor 16 is about 160 feet in length. A second portion 34 of the pilaster 26 is preferably disposed between the ocean floor 16 and the surface 14 of the ocean, and a third portion 36 of the pilaster 26 is preferably disposed above the surface 14 of the ocean. The pilaster 26 is preferably is circular in cross section and in a preferred embodiment has a diameter of 24 inches. A function of the pilaster 26 is to anchor the system 10 in a location in the ocean. As alluded to above and as shown in FIG. 2, the wave power collection system may have a plurality of floats 12 depicted in FIG. 1. Each of these floats 12 may have a pillistar 26 disposed in the annulus defined by the float 12.

The system 10 may further include a cylinder 24, as alluded to above. The cylinder 24 is preferably disposed in the annulus defined by the toroid shaped float. In addition, the cylinder 24 is preferably disposed around the periphery of the pilaster 26.

As shown in FIGS. 1 and 4, the pilaster 26 has a plurality of rails 38 that are disposed longitudinally along its periphery. Each set of rails 38 defines a groove 40. Preferably, the pilaster 26 has four sets of rails 38 that are spaced about 90° from two of the other sets of rails 38. By disposing the rails 38 in this fashion, the pilaster 26 has four grooves 40 that are spaced evenly about the periphery of the pilaster 26. The cylinder 24 preferably has a plurality of rollers 42. These rollers 42 are preferably disposed around the cylinder 24 so that are aligned with the grooves 40 defined by the rails 38 of the pilaster 26. The rollers 42 can roll in these grooves 40, so that the cylinder 24 can move with respect to the pilaster 26, in response to movement of the ocean waves. Other mechanisms may be employed to couple the cylinder 24 to the pilaster 26, so that the cylinder 26 is moveable with respect to the pilaster 26. The description of the rails 38, grooves 40 and rollers 42 is provided by way of example and not be way of limitation.

The toroidal shaped float 12 is preferably coupled to the cylinder 24 by a plurality of hinges 44. Each segment 28 of the float 12 is preferably coupled to the cylinder 24 with its own hinge 44. Each hinge 44 may include a pair of brackets 46 disposed on the cylinder 24 and a pin 48. The pin 48 is preferably disposed between the brackets 46. Further, each hinge 44 preferably has a pair of brackets 50 and a pin 52 disposed on the respective segment 28 of the float 12. A hinged bar 54 may be coupled to the pin 48 that is disposed through the brackets 46 on the cylinder 24 and the pin 52 that is disposed through the bracket 50 of the respective segment 28 of the float 12. This hinged bar 54 is rotatable with respect to the pin 48 that is disposed through the bracket 46 on the cylinder 24. Thus, as the respective segment 28 of the float 12 moves up and down in response to the ocean waves, the hinged bar 54 rotates about the pin 48 that is disposed through the brackets 46 on the cylinder 24.

As mentioned above, the wave enhancer 22 of this invention may be employed with a variety of wave power collection systems 10. A further explanation of the operation of the wave enhancer 22 is provided with reference to a hydraulic mechanism 17 for converting the movement of the floats 12 into energy to drive a prime mover 18. The hydraulic mechanism 17 itself is not part of the disclosed invention, but may be used in combination with the wave enhancer 22 of this invention to form a system of this invention 10. The wave enhancer 22 may be employed with other systems and the description of the wave enhancer's 22 operation with a hydraulic mechanism 17 is described by way of example and not by way of limitation.

Figure 5:
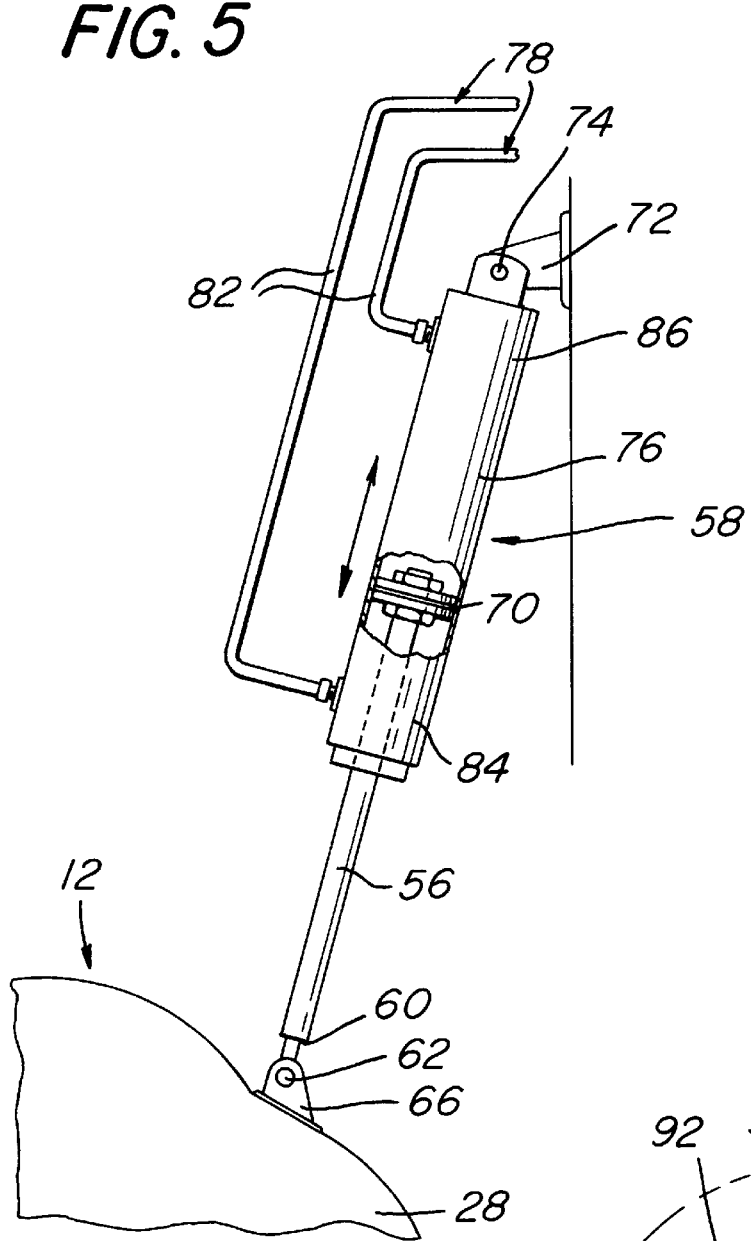
FIG. 5 is a diagrammatical view of a portion of a preferred embodiment of FIG. 1.

In the system shown in FIGS. 1 and 5, each of the segments 28 of the float 12 may be connected to the cylinder 24 by elements of the hydraulic mechanism 17. The elements of the hydraulic system include a rod 56, a portion of which is disposed in a tubular member 58. Each of the rods 56 is connected at one of its longitudinal ends 60 to the float 12. Each longitudinal end 60 of each rod may be connected to the float 12 in any one of a variety of ways. One fastening mechanism includes a pin 62 that extends through apertures 64 in a bracket 66 connected to the float 12, as shown in FIGS. 1 and 5. The pin 62 extends through the aperture 64 in one of the brackets 66, through a bore (not shown) in the longitudinal end 60 of the rod 56 and through the aperture 64 in the other bracket 66 that is used to connect the rod 56 to the float 12. This type of fastening mechanism is provided by way of example and not by way of limitation.

The other longitudinal end 70 of each rod 24 extends into one of the tubular members 58 that are each connected to the cylinder 24. These tubular members 58 may be connected to the cylinder 24 with brackets 72 and pins 74, similar to the way the rods 56 are each connected to the float 12. Brackets 72 and pins 74 are depicted in FIGS. 1 and 5 as the fastening mechanisms for fastening the tubular members 58 to the cylinder 24. Again, these tubular members 58 may be coupled to the cylinder 24 in any of a variety of known fastening techniques.

The end 70 of the rod 56 that is disposed in the interior 76 of the tubular member 58 may have a head so that it can act as a piston. Each of the tubular members 58 may have a fluid, such as hydraulic fluid disposed in its interior 76. Preferably, the hydraulic fluid is a biogradable fluid. As the respective segment 28 of the float 12 moves upward, the respective rod 56 will move further into the interior 76 of the tubular member 58. This causes the pressure of the hydraulic fluid disposed near the longitudinal end 86 of the tubular member 58 to be increased, as the hydraulic fluid is compressed by the head on the longitudinal end 70 of the rod 56. The hydraulic fluid carries this increase in pressure through a piping system 78 to the prime mover 18, the hydraulic motor, as described in more detail below. Of course, as the rod 56 moves further into the interior 56 of the tubular member 58, the volume on the other side of head of the longitudinal end 70 of the rod 56 increases and hydraulic fluid is ported through the piping system 78 to fill this increased volume.

Coupled to each of the tubular members 28 is a valve 80, as shown diagrammatically in FIG. 1. A pair of conduits 82, preferably couple each longitudinal end 84, 86 of the tubular member 58 to the valve 80. This valve 80 acts to transfer the hydraulic fluid to a plurality of conduits of the piping system 78 that connect the valve 80 to a prime mover 18, as best shown in FIG. 2. The valve is any of a conventional type of hydraulic marine four way valves. Instead of a four way type valve, ball check valves can be used.

The wave power collection system 10 may further include a prime mover 18, such as a hydraulic motor, for driving a load 20, for example an electrical generator to produce electricity. Thus, the movement of the wave, including the increased movement due to the wave enhancer 22, is converted into useful energy. Since each segment 28 of each float 12 is free to move independent of the other segments 28 of the respective float 12, the movement of each segment 28 will cause the hydraulic fluid in the respective tubular member 58 to be increased, so that the energy of that hydraulic fluid may be extracted.

What has been described thus far is not novel, but may be used in combination with the wave enhancer 22 of this invention. As shown in FIGS. 1, 3 and 4, in a preferred embodiment of this invention, the wave enhancer 22 is defined by a plate that is coupled to the cylinder 24. In the preferred embodiment shown, the plate 22 has a lifting surface 88 that is disposed in an angular relationship with the direction of motion of the waves. Preferably, the lifting surface 88 is disposed at an angle of 90° with the direction of motion of the waves. However, the lifting surface 88 may be disposed at other angles with respect to the direction of motion of the waves. The direction of motion of the waves is indicated by the line W in FIG. 1. In the preferred embodiment depicted, the waver power collection system has two wave enhancers 22.

Figure 6:
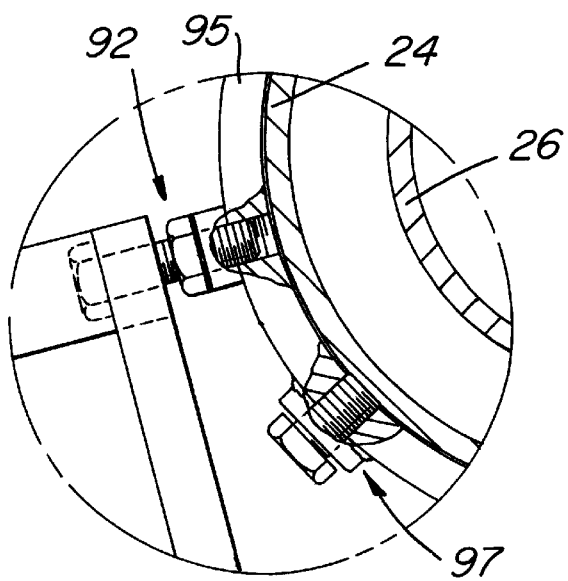
FIG. 6 is enlarged view of detail 6 of FIG. 4.

The wave enhancer 22 is preferably coupled to the cylinder 24 of the wave power collection system 10 by a coupling mechanism 90. A variety of coupling mechanisms 90 may be employed to couple the wave enhancer 22 to the cylinder 24. Preferably, the coupling mechanism 90 includes threaded connectors 92, so that the wave enhancer 22 is adjustable with respect to the cylinder 24. Most preferably, the cylinder 24 has a collar 95 disposed around the cylinder 24, as shown in FIG. 1. The wave enhancer 22 may be attached to the collar 95 with threaded connector 92, and the collar 95 may be attached by any member of fastening mechanisms 97 to the cylinder 24. In the embodiment depicted in FIGS. 1 and 6, the fastening mechanism 97 is a threaded fastener. The threaded fastener can be fastened to the cylinder 24 in any of a variety locations, so that the wave enhancer 22 is adjustable with respect to the cylinder 24. In particular, the collar 95 can be rotated with respect to the cylinder 24 and tightened with the fastening mechanism to adjust the position of the wave enhancer 22. As mentioned above, the cylinder 24 may have two wave enhancers 22. The other wave enhancer 22 may be mounted in a similar fashion so that it is separately rotatable about the cylinder 24.

As mentioned the wave enhancer 22 is attached to the collar 95 with threaded connectors 92 or another fastening mechanism. The threaded fastener 92 is attached to a bar 99, which is coupled to the wave enhancer 22. The bar 99 is pivotable about the threaded fastener 92, so that the angle of the wave enhancer 22 with the vertical plane can be adjusted.

By adjusting the wave enhancer's rotational position with respect to the cylinder and the angle of the wave enhancer 22 with the vertical plane, the amplitude of the wave can be maximized. In particular, the rotational position of the wave enhancer 22 and its angle with respect to the vertical plane can be selected so that based on the direction of motion of the waves an optimum position can be selected that maximizes the amplitude of the waves.

As shown in FIGS. 1 and 4, the wave enhancer 22 may include two plates that are rotatably mounted to the cylinder 24. These plates may each be positioned as shown in FIG. 1 so that there is no gap or separation between them. In the position illustrated, the plates are mated to form a "V" shape. Since each plate is separately rotatable with respect to the cylinder, they may be placed in another position. However, the position shown is preferred because when the force of an incoming wave is placed on the plates, the force will not be diminished by water flowing through a gap between the plates. This potentially maximizes the upward force created by the wave enhancer and thus, the amplitude of the waves.

In operation, waves flow generally in the direction W as noted in FIG. 1. Optimally, the wave enhancer 22 is positioned to generate the greatest change in the amplitude of the waves. The optimum position includes the placement of a portion of the wave enhancer 22 below the ocean surface and the angle of the face of the wave enhancer 22 with respect to the direction of motion W of the waves. As mentioned above, the wave enhancer 22 is preferably placed at an angle of about 90° with respect to the direction of motion of the waves. As the waves flows and reaches the wave enhancer 22, the wave enhancer 22 creates a lifting force, which causes the waves to increase in amplitude. This increase in amplitude of the waves causes the float 12 to move a greater vertical distance for a given wave cycle. Because of the greater movement of the float 12, a larger amount of energy can be extracted from the a given wave, then without the wave enhancer 22.

The lifting force is generated by the force in the horizontal direction of the waves (the force of the waves in the direction parallel to the ocean floor) contacting the surface 88 of the wave enhancer 22. As described above, the wave enhancer 22 is preferably disposed vertically and at about a right angle with respect to the horizontal force of the waves. Therefore, when the horizontal force of the waves contacts the wave enhancer 22, a force in the vertical direction, or lifting force is created. This force causes the amplitude of the waves to be greater.

In further detail, as the ocean wave lifts a segment 28 of the float 12, the segment 28 of the float 12 rises and rotates about the hinged connection 54, as described above. That is the segment 28 rotates upward about the pin 48 that is disposed through the brackets 46 that are disposed on the cylinder 24. As the segment 28 of the float 12 rotates upward, the rod 56 connected to that segment 28 moves further into the interior of the tubular member 58 and compresses the hydraulic fluid in the top 86 of the tubular member 58. The valve 80 responds to this increase in pressure to reposition and ports the hydraulic fluid with the increased pressure to the prime mover 18 and powers the prime mover 18, which drives the load 20. The valve 80 also ports lower pressure hydraulic fluid, lower than the pressure of the hydraulic fluid compressed by the rod 56, from the conduits 82 to the other longitudinal end 84 of the tubular member 58 to account for the increase in volume due to the movement of the rod 56.

Similarly, as the segment 28 of the float 12 moves downward, the segment 28 rotates about the hinged bar 54. As the segment 28 rotates downward, the rod 56 connected to that segment 28 extends from the tubular member 58. As the rod 56 moves, the rod 56 compresses the hydraulic fluid on the bottom 84 of the tubular member 58. This pressurized hydraulic fluid causes the valve 80 to reposition and port the pressurized hydraulic fluid to the prime mover 18, and powers the prime mover 18 to drive the load 20. When the valve 80 repositions, hydraulic fluid is returned to the top 86 of the tubular member 58 to compensate for the downward movement of the rod 56.

Each segment 28 of the float 12 operates in a similar fashion, and the piping system 78 is constructed to port the increase in pressure of the hydraulic fluid from the movement of each segment 28 to the prime mover 18. Similarly, the piping system is constructed so that the movement of each segment 28 of the multitude of floats 12 is converted to an increase in the pressure of the hydraulic fluid, so that they all work together to drive the prime mover 18.

Because of the wave enhancer 22, the amplitude of a given wave is increased. This permits an additional amount of energy to be extracted from a given wave. Because of the increase in the amount of energy that can be extracted from a given wave, the wave power collection system 10 may be employed in regions of the ocean that have relatively small waves, including coastal regions. Without the wave enhancer 22, the amount of energy that could be extracted from a given wave in some regions of the ocean is so low, that is not feasible to locate a wave power collection system in that region. However, with the wave enhancer 22, the wave power collection system 10 can be disposed in some regions where it may not have been able to be located without the wave enhancer 22. In addition, the wave enhancer 22 may be employed with a wave power collection system 10 that is disposed in a region where it could have been disposed without the wave enhancer 22, but the wave enhancer 22 will increase the amount of energy that can be extracted from a given wave.

The preferred embodiments described herein are illustrative only and, although the examples given include many specifics, they are intended as illustrative of only one possible embodiment of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

What is claimed:

1. A system for enhancing the amplitude of an ocean wave, comprising:
   a float for floating on the surface of the fluid, the float having the shape of a toroid;
   a cylinder coupled to the float and disposed inside of the aperture defined by the toroidal shaped float; and
   a wave enhancer, coupled to the cylinder, for disposing below the surface of the ocean, the wave enhancer having a surface that is disposed in angular relationship with the direction of motion of the ocean waves of the fluid to enhance the amplitude of the waves.

2. The system of claim 1, wherein the wave enhancer comprises a plate.

3. The system of claim 1, wherein the wave enhancer comprises a plurality of plates, coupled to the cylinder and disposed in an angular relationship with each other.

4. The system of claim 1, wherein the angular relationship comprises an angle of about ninety degrees.

5. The system of claim 1, further comprising a pilaster, coupled to the cylinder, the pilaster comprising a portion for disposing below the ocean floor, so that the cylinder and the float are moveable with respect to the pilaster.

6. The system of claim 1, wherein the wave enhancer comprises a portion for disposing beneath an ocean floor.

7. The system of claim 1, further comprising a rod coupled to the float and a tubular member coupled to the cylinder, the tubular member having an interior in which a hydraulic fluid disposed and the rod having a portion of which is disposed in the interior of the tubular member, the rod being moveable within the tubular member in response to movement of the float to pressurize the hydraulic fluid in the interior of the tubular member.

8. The system of claim 7, further comprising a hydraulic motor coupled to the tubular member and driven by the hydraulic fluid disposed in the interior of the tubular member.

9. The system of claim 1, wherein the float is coupled to the cylinder by a hinge.

10. A system for enhancing the amplitude of an ocean wave and thereby generating more energy from the ocean wave, comprising:
    a torid for floating on a surface of the ocean wave;

a cylinder, disposed in an aperture defined by the toroid;

a tubular member, coupled to the torid and the cylinder, and having an interior in which a hydraulic fluid is disposed;

a rod, having an end that is coupled to the float and an end that is disposed inside the interior of the tubular member, so that movement of the torid in response to the ocean waves causes the rod to move inside the interior of the tubular member and compress the hydraulic fluid in the interior of the tubular member to change the pressure of the hydraulic fluid in the interior of the tubular member; and a wave enhancer, coupled to the cylinder, for disposing below the surface of the ocean wave, so that the ocean wave will increase in amplitude as the ocean wave contacts the plate.

11. The system of claim 10, wherein the wave enhancer comprises a plate.

12. The system of claim 10, wherein the wave enhancer comprises a plurality of plates, coupled to the cylinder and disposed in an angular relationship with each other.

13. The system of claim 12, wherein the angular relationship comprises an angle of about ninety degrees.

14. The system of claim 10, further comprising a pilaster, coupled to the cylinder, the pilaster comprising a portion for disposing below the ocean floor, so that the cylinder and the toroid are moveable with respect to the pilaster.

15. The system of claim 10, wherein the wave enhancer comprises a portion for disposing beneath an ocean floor.

16. The system of claim 10, further comprising a hydraulic motor coupled to the tubular member and driven by the hydraulic fluid disposed in the interior of the tubular member.

17. The system of claim 10, wherein the toroid is coupled to the cylinder by a hinge.

18. The system of claim 10, wherein the toroid comprises four segments that are independently moveable in response to movement of the waves.

19. The system of claim 14, further comprising a groove disposed on the pilaster and a roller disposed on the cylinder, the roller of the cylinder being slidable in the groove of the pilaster.

20. A system for enhancing the amplitude of an ocean wave and thereby generating more energy from the ocean wave, comprising:

a toroid for floating on a surface of the ocean wave;

a cylinder, disposed in an aperture defined by the toroid;

a tubular member, coupled to the toroid and the cylinder, and having an interior in which a hydraulic fluid is disposed;

a rod, having an end that is coupled to the float and an end that is disposed inside the interior of the tubular member, so that movement of the toroid in response to the ocean waves causes the rod to move inside the interior of the tubular member and compress the hydraulic fluid in the interior of the tubular member to change the pressure of the hydraulic fluid in the interior of the tubular member;

a wave enhancer, coupled to the cylinder, for disposing below the surface of the ocean wave, so that the ocean wave will increase in amplitude as the ocean wave contacts the plate;

a for driving an electrical generator, the prime mover being powered by the hydraulic fluid; and a conduit connecting the tubular member to the prime mover.

* * * * *